United States Patent
Gilliland et al.

[19]

[11] Patent Number: 6,059,073
[45] Date of Patent: May 9, 2000

[54] OVERSPEED VALVE FOR HYDRAULIC ELEVATOR

[75] Inventors: Oscar Gilliland, Nesbit, Miss.; Augusts Kiperts, Memphis, Tenn.

[73] Assignee: Delaware Capital Formation, Inc., Wilmington, Del.

[21] Appl. No.: 09/058,709

[22] Filed: Apr. 10, 1998

[51] Int. Cl.[7] .................................................. B66B 9/04
[52] U.S. Cl. ........................................ 187/275; 187/286
[58] Field of Search .................................. 187/275, 272, 187/286; 91/454, 452, 446, 448

[56] References Cited

U.S. PATENT DOCUMENTS

| | | | |
|---|---|---|---|
| 4,800,990 | 1/1989 | Blain | 187/17 |
| 5,289,901 | 3/1994 | Fargo | 187/275 |

*Primary Examiner*—Kenneth W. Noland
*Attorney, Agent, or Firm*—White & Case LLP

[57] ABSTRACT

A hydraulic elevator includes a car supported by at least one jack, and a fluid line for venting hydraulic fluid from the jack for lowering the car. An overspeed valve, disposed in the fluid line, comprises a housing having an inlet chamber and an outlet chamber. A piston is mounted on a stem disposed inside of the housing so as to be axially moveable, relative to the stem and housing, between an open position, allowing fluid communication between the inlet chamber and the outlet chamber, and a closed position, in which the piston at least essentially blocks fluid communication between said inlet and outlet chambers. A pressure chamber is formed behind the rearward end of the piston, and a conduit, preferably formed in the piston, allows fluid from the inlet chamber to flow into the pressure chamber. A spring, together with the pressure downstream of the valve, urge the piston towards its open position, whereas fluid in the pressure chamber urge the piston towards its closed position. Under normal conditions, the downstream pressure is sufficient to keep the valve open, to allow the elevator car to descend. Should the pressure drop across the valve exceed a predetermined amount, as would occur if the oil line should break, the valve is pushed closed which stops downward elevator movement. Preferably, the stem is coupled to the housing for adjustment in an axial direction for increasing or decreasing the distance between the open and closed positions, which, due to the higher spring force required to close the valve, will change the amount of downstream pressure drop required before the valve will close.

4 Claims, 3 Drawing Sheets

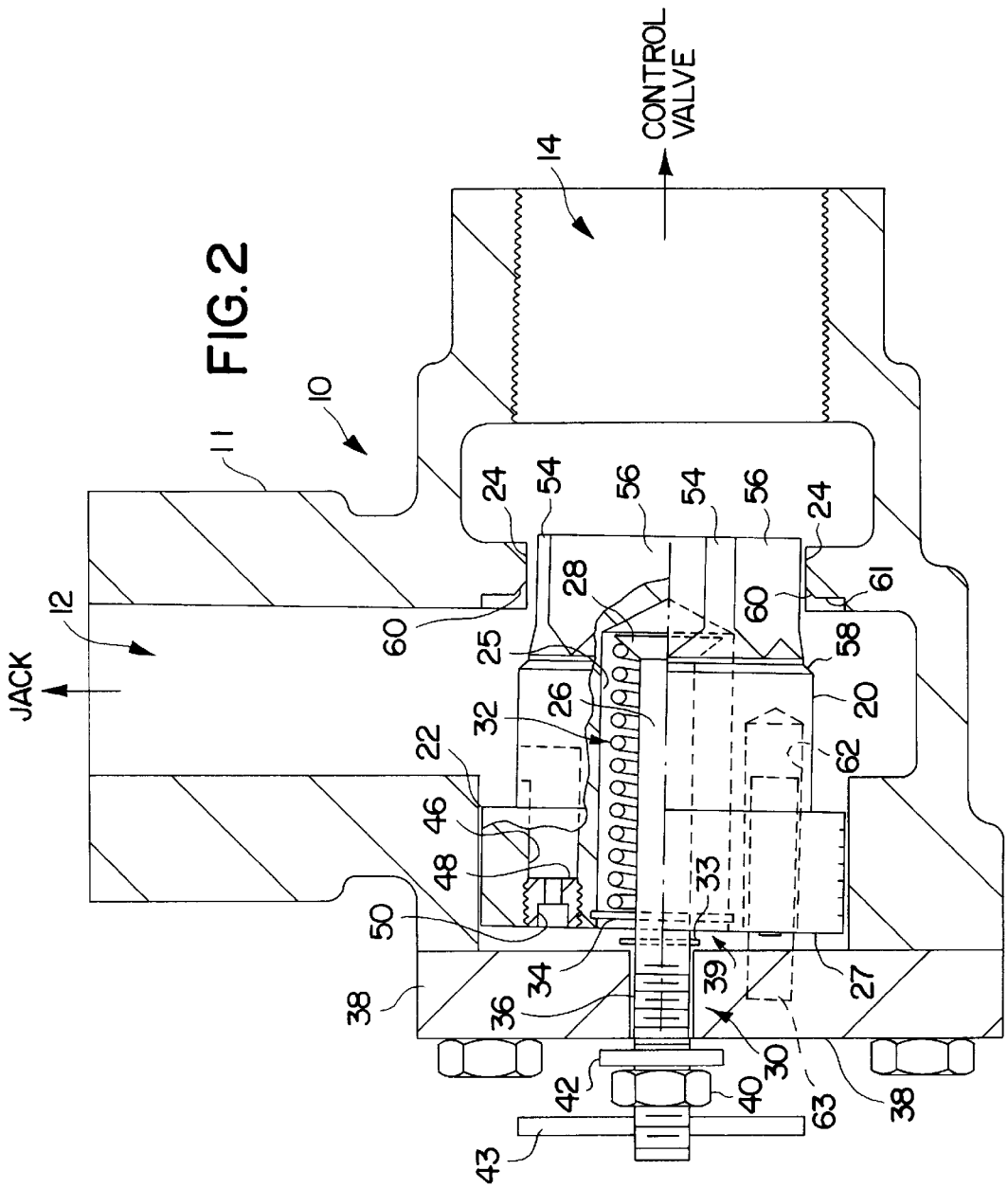

OVERSPEED VALVE FOR HYDRAULIC ELEVATOR

FIELD OF INVENTION

The present invention relates to hydraulic elevators, and in particular to a new overspeed valve for use in hydraulic elevators.

BACKGROUND OF THE INVENTION

There are two common types of passenger and freight elevators. In traction elevators, a car is suspended on a rope which is entrained over a drive sheave located in the penthouse of the building. The other end of the rope connected to a counterweight, and a motor rotates the sheave so as to move the car up and down the hoistway between floors or landings. The other common type of elevator is a hydraulic elevator.

Hydraulic elevators employ one or more hydraulic jacks, which are used to raise and lower the car between landings. To raise the car, a motor-driven pump supplies pressurized hydraulic fluid to the jack. In order to lower the car, hydraulic fluid in the jack is vented back to a reservoir.

When moving between floors, it is necessary to control accurately the rate and amount of fluid supplied to the jack, so as to provide a smooth ride and such that the car stops level with the floor. In most hydraulic elevators, this is done with a control valve. When the car is commanded to move to a higher floor, such as when a passengers activates a floor button inside the car or at a hall landing, the pump motor is started, and the pump supplies hydraulic fluid to the control valve which, in turn, supplies pressurized fluid to the jack. When a passenger commands the car to move downwardly, the valve vents fluid from the jack back to the reservoir, bypassing the pump.

In both the up and down directions, the valve is used to control the speed and position of the car. When traveling in the up direction, the valve regulates the amount of pressurized fluid supplied by the pump which is delivered to the jack, by venting some or all of the fluid from the pump back to the reservoir. In this manner, the valve controls the car's upward speed and stops the car when it reaches the desired landing. In the downward direction, the valve regulates the rate at which fluid is vented from the jack to the reservoir to do the same thing.

Generally, hydraulic elevator control valves provide for two flow rates, and thereby two speeds. While traveling between floors, the valve operates at a fast speed setting, allowing a preset maximum flow rate. As the car nears the landing, the valve switches to a slower speed setting, thereby reducing the rate of fluid flow to or from the jack as the car nears the landing.

The foregoing elevators generally use a fixed speed a/c motor and a fixed displacement pump. It has, however, been proposed to control the car's movement using a variable speed pump, which offers the advantage of being able to operate the car at smoothly varying speeds rather than the fixed speeds available from a valve. Another option is to use a fixed displacement pump but with a variable speed motor. However, until recent years this would have required the use of a DC motor which, in the case of hydraulic elevators, is cost prohibitive. More recently, however, with advances in VVVF a/c motor controls, low cost, variable speed, a/c motors are available, which can be used, along with a fixed displacement pump, in place of a valve, to control the rate of fluid flow and thereby the speed of the car.

Hydraulic fluid in the jack must be under sufficient pressure to support both the weight of the car and its own weight. Therefore, fluid in the fluid lines is under relatively high pressure as well, and can cause the line, or connections, to break. If an oil line between the valve and jack should breaks, the elevator car may descend very rapidly. It would therefore be desirable to provide a valve that responds in the case of car overspeed adjacent the jack outlet, such that should any problem occur overspeed would be prevented.

SUMMARY OF THE INVENTION

A hydraulic elevator includes a car supported by at least one jack, and a fluid line for venting hydraulic fluid from the jack for lowering said car. An overspeed valve, which is disposed in the fluid line, has a housing with an inlet chamber and an outlet chamber. A piston is mounted on a stem disposed inside of the housing so as to be axially moveable, relative to the stem and housing, between an open position, allowing fluid communication between the inlet chamber and the outlet chamber, and a closed position, in which the piston at least essentially blocks fluid communication between the inlet and outlet chambers. A pressure chamber is formed behind the rearward end of the piston, and a conduit, preferably formed in the piston, allows fluid from the inlet chamber to flow into the pressure chamber.

A spring and the pressurized fluid on the downstream side of the piston urge the piston towards its open position, whereas fluid in the pressure chamber urges the piston towards its closed position. Under normal conditions, the downstream pressure is sufficient to keep the valve open, to allow the elevator car to descend. Should there be a pressure drop downstream of the valve, as would occur if the oil line should break, the valve is pushed closed, which substantially stops further downward elevator movement. Preferably, the stem is coupled to said housing for adjustment in an axial direction for increasing or decreasing the distance between the open and closed positions. By increasing the such distance, a higher spring force is required to close the valve, which will reduce the amount of downstream pressure needed to maintain the valve open.

For a better understanding of the invention, reference is made to the following detailed description of a preferred embodiment, taken in conjunction with the drawings accompanying the application.

BRIEF DESCRIPTION OF THE DRAWINGS

FIG. 2 is a partial sectional view, taken in the direction of arrows 2—2 of FIG. 1;

DETAILED DESCRIPTION OF PREFERRED EMBODIMENTS

Figure 6:
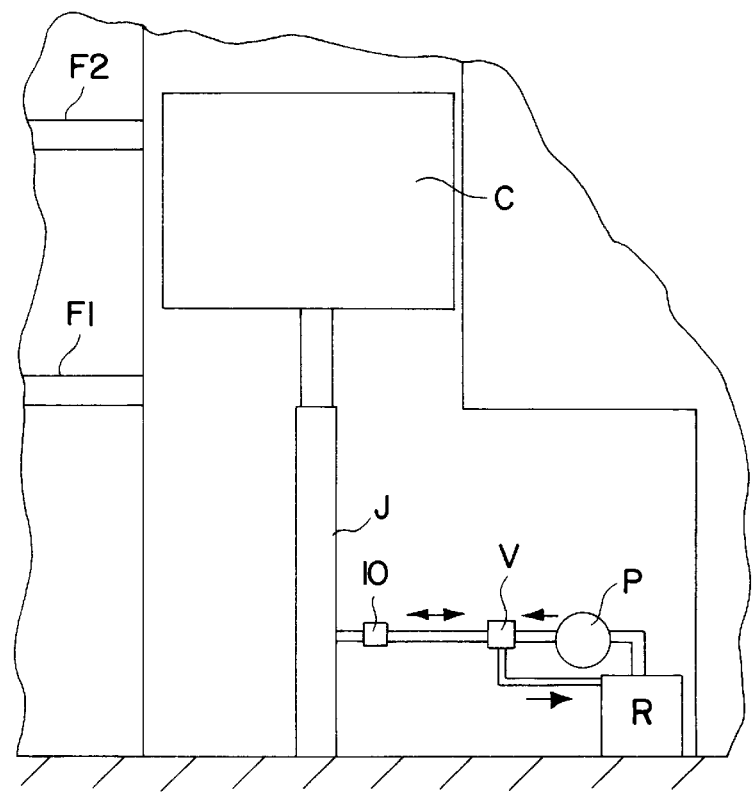
FIG. 6 is a schematic drawing of a hydraulic elevator employing the valve of the present invention.

FIG. 6 shows a hydraulic elevator which includes a car "C" supported by a hydraulic jack "J". A pump "P" selectively pumps hydraulic fluid from a reservoir "R" to a control valve "V". The valve provides hydraulic fluid from the pump "P" to the jack "J" to raise the car "C" between floors "F1" and "F2", and vents fluid from the jack "J" back to the reservoir "R" to lower the car "C". Further, in accordance with the present invention, an overspeed valve 10, described further below, is disposed in the hydraulic feed/return line leading to the jack. Preferably, the overspeed valve is piped as close to the elevator jack as possible.

Referring to FIG. 2, an overspeed valve 10 according to the invention includes a valve housing 11 with a pair of chambers 12, 14 which, during downward movement of a hydraulic elevator, serve as an inlet chamber 12 and an outlet chamber 14, respectively. It should be noted that, during upward movement of an elevator, the reverse is true, with chamber 14 serving as the inlet chamber, and chamber 12 serving as the outlet chamber. For purposes of the present application, because the valve 10 is intended to operate during overspeed conditions, in which the elevator is moving downwardly, chamber 12 will be referred to as the inlet chamber, and chamber 14 will be referred to as the outlet chamber.

A piston 20 is disposed in the housing 10 and moveable, in the direction of its axis, within a pair of axially spaced, annular guide sections 22, 24. The guide section 24 separates the inlet chamber 12 from the outlet chamber 14. The space between the guide sections 22, 24 form part of the inlet chamber 12. As shown, the rear face 27 of the piston is spaced a distance from the rear housing cover 38, so as to form, together with the annular wall of the guide section 22, a pressure chamber 39 behind the piston 20.

The piston includes an opening 25 that extends from the rear surface 27 of the piston 20 in an axial direction. A stem 26, which has a flared forward end 28 and a threaded rearward end 30, extends into the opening 25. A spring 32 is disposed in the opening 25, and engages the flared forward end 28 of the stem 26. The opposite end of the spring 32 is held by a retainer ring 34, which is secured against movement relative to the piston 20 in a groove as shown.

The threaded end 30 of the stem 26 extends through a threaded hole 36 in the rear housing cover 38, and is locked in place by a nut 40 and washer 42. A pin 43 extends through a hole 44 at the rear end of the stem 26 (see FIG. 5) for turning the stem 26, such that, with nut 40 loosened, its axial position can be adjusted. Preferably, a pin 33 extends through the stem 26 in the pressure chamber 39 so as to limit the rearward adjustability of the stem 26. With the stem locked in position, forward movement of the piston 20 compresses the spring 32, such that the spring opposes any forward movement.

A conduit 46 provides fluid communication between the rear face 27 of the piston 20 and the inlet chamber 12. Preferably, a flow restriction plug 48, having a small bore 50, is disposed in the conduit 46. In the example shown, the plug 48 has a threaded exterior, which screws into a threaded bore portion 52 of the conduit 48.

The forward end 54 of the piston 20 includes an annular bevelled shoulder 58, which contacts a bevelled rear edge 60 of the annular guide portion 24 when the piston 20 moves forward into its closed position. This blocks fluid flow between the chambers 12, 14. A counterbore 61 cleans up the casting surface to allow the 45 degree seat chamfer of edge 60 to be produced properly. When the piston is in a retracted position, such that the shoulder 58 is not in contact with the rear edge 60 of the guide portion 24 (e.g., in the position shown in FIG. 2), a plurality of openings 56 in the forward end of the piston, i.e., the portion within guide portion 24, allow fluid flow between the inlet chamber 12 and the outlet chamber 14.

Figure 1:
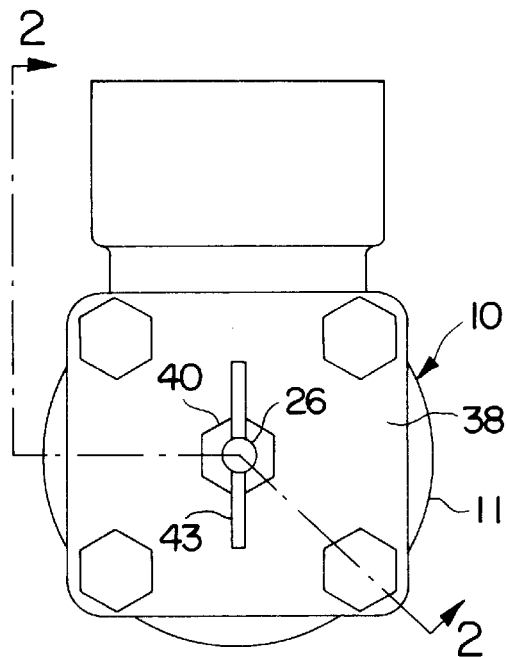
FIG. 1 is a rear view of a safety valve according to the invention.
Figure 3:
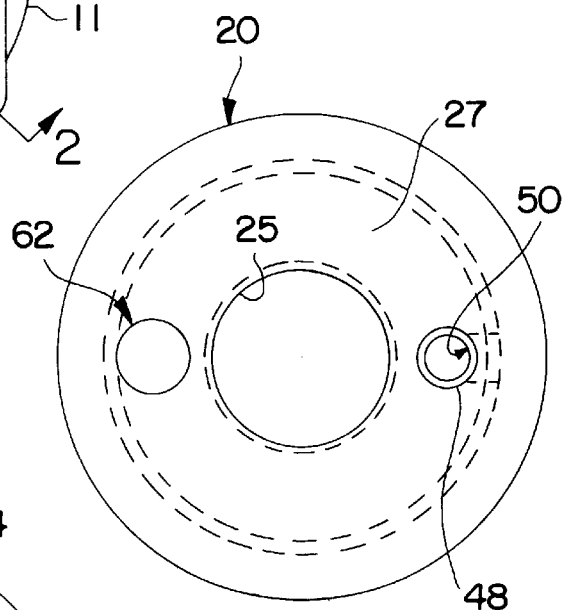
FIGS. 3 and 4 are rear and front views, respectively, of the piston used in the valve.
Figure 4:
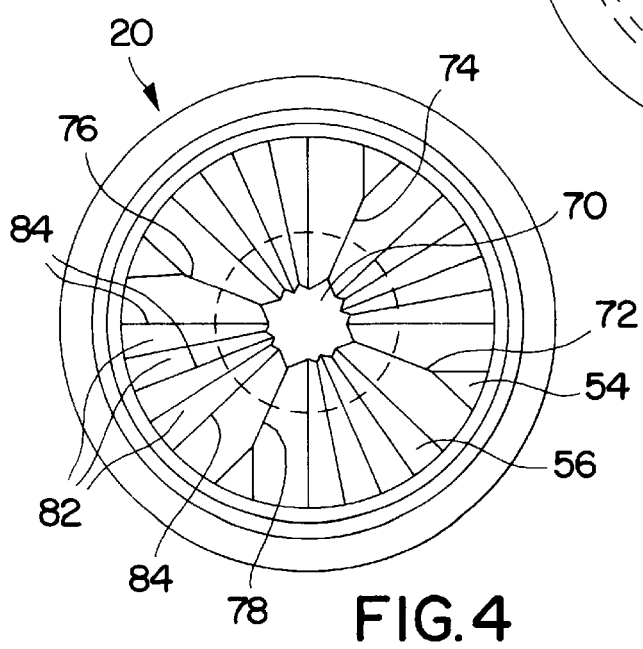
Figure 5:
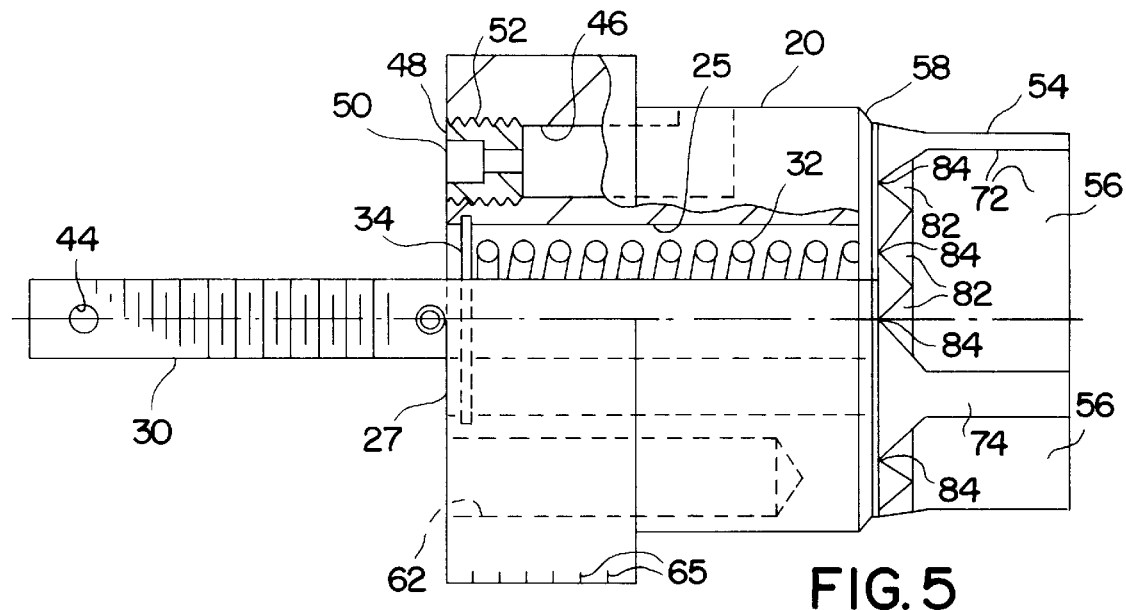
FIG. 5 is side view, partially in section, of the piston assembly.

Referring to FIGS. 4 and 5, the forward end 56 of the piston includes a piston wall with a center core 70 and four wall portions 72, 74, 76, 78 radiating therefrom. The spaces between the wall portions 72, 74, 76, 78 define four main openings 56 which extend rearwardly from the forward tip of the piston. The wall portions 72, 74, 76, 78 have flared bottom portions 80, and the bottom wall of the piston forward end includes V-shaped openings 82, with the centers 84 of the "V's" also emanating radially from the core 70.

A hole 62 extends axially from the rear face 27 of the piston, and an anti-rotator rod 63, which has one end fixed in the plate 38, extends into the hole 62. The rod 63 allows the piston to slide axially, but prevents the rotation of the piston in order to control pressure drop across the piston in a consistent manner. Finally, a plurality of annular oil grooves 65, shown schematically in FIG. 5, may be formed in the rear portion of the piston 20. In an exemplary embodiment, the grooves are v-shape with a 60 degree angle.

In operation, when the car is raised, pressurized hydraulic fluid from the pump "P" enters the valve through chamber 14. The force which the incoming hydraulic fluid exerts on the forward end of the piston 20 maintains the piston 20 in its retracted, open position, allowing fluid to flow through the openings 56 into chamber 12, and thereafter to the jack "J".

When the car is lowered, the pressure in the outlet chamber 14 will be lower than the pressure in the inlet chamber 12 and in the pressurize chamber 39 (which communicate with one another through conduit opening 50). Pressurized fluid in the pressure chamber 39 applies a force against the rear surface 27 of the piston in the direction of the closed position (towards the right in FIG. 2). The force against the rear surface 27 of the piston 20 is opposed by the force of the spring 32, which urges the piston 20 to remain in the open position, and is also opposed by the pressurized fluid present in chamber 14.

Under normal descents, the pressure within chamber 14 is sufficient, together with the force of the spring 32, to maintain the piston 20 in the open position, allowing fluid to continue to flow from chamber 12 to chamber 14 through the openings 56, and thereafter to the control valve "V" and reservoir "R". However, if the pressure in chamber 14 falls below a predetermined value, as would occur if there were to be a break in the oil line between the overspeed valve 10 and the control valve "V", the fluid pressure in pressure chamber 39 overcomes the force of the spring and pushes the valve piston 20 closed, blocking off the flow of oil from chamber 12 to 14, and thereby stopping further descent of the car.

During normal elevator descents, the piston 20 will be sufficiently retracted such that oil can flow through the main openings 56. However, as shown by FIG. 2, as the piston 20 nears its closed positions, the flow of oil across the piston is restricted to the V-shaped openings 82. Moreover, as the piston 20 closes, the flow area across the V-shaped openings 82 continuously decreases, which will produce a smooth transition of the piston movement to a stop.

The stem 26 is adjusted so that, with no fluid pressure in the chambers 39 and 14, the annular shoulder 58 is spaced from the edge 60 of the guide section, i.e., such that the valve piston 20 is in an open position, as shown in FIG. 2. The greater the distance the piston must move forward before reaching its closed position, the greater the opposing spring force needed to be overcome. Therefore, by turning the pin 43, and thereby changing the distance between the open and closed positions of the piston 20, the amount of pressure drop required, before the overspeed valve will close, can be adjusted. Preferably, as shown in FIG. 2, however, the piston, in normal operation, is sufficiently retracted so that oil can flow from the chamber 12 to the chamber 14 through the main openings 56, and not merely the V-shaped openings 82.

The foregoing represents preferred embodiments of the invention. Variations and modifications will be apparent to persons skilled in the art, without departing from the inventive concepts disclosed herein. All such modifications and variations are intended to be within the skill of the art, as defined in the following claims.

We claim:

1. In a hydraulic elevator having a car supported by at least one jack, and a fluid line for venting hydraulic fluid from said at least one jack for lowering said car, the improvement comprising an overspeed valve connected into said line, said valve comprising:

a housing having an interior including an inlet chamber and an outlet chamber for hydraulic fluid, a stem disposed in said housing interior and coupled to said housing, a piston mounted on said stem so as to be axially moveable relative to said stem and housing, between an open position, allowing fluid communication between said inlet chamber and said outlet chamber, and a closed position, in which said piston at least essentially blocks fluid communication between said inlet and outlet chambers; wherein said piston has a rearward end having a first piston surface and a forward end having a second piston surface, wherein said second piston surface is disposed in said outlet chamber, and wherein said housing provides a pressure chamber between said first piston surface and an interior housing wall, conduit means for allowing fluid to flow from said inlet chamber to said pressure chamber for urging said piston in a forward direction, and a spring means for urging said piston in a rearward direction, whereby under conditions in which the pressure drop between said inlet and outlet chambers is normal, the rearward forces generated by pressurized fluid in said outlet chamber and said spring force are sufficient to overcome the forward force generated by pressurized fluid in said pressure chamber and thereby maintain said valve in said first position;

wherein said stem is coupled to said housing for adjustment in an axial direction for increasing or decreasing the distance between said open and closed positions.

2. An elevator according to claim 1, wherein said conduit means is formed by a passage through said piston.

3. In a hydraulic elevator having a car supported by at least one jack, and a fluid line for venting hydraulic fluid from said at least one jack for lowering said car, the improvement comprising an overspeed valve connected into said line, said valve comprising:

a housing having an interior including an inlet chamber and an outlet chamber for hydraulic fluid, a stem disposed in said housing interior and coupled to said housing, a piston mounted on said stem so as to be axially moveable relative to said stem and housing between an open position, allowing fluid communication between said inlet chamber and said outlet chamber, and a closed position, in which said piston at least essentially blocks fluid communication between said inlet and outlet chambers; wherein said piston has a rearward end having a first piston surface and a forward end having a second piston surface, wherein said second piston surface is disposed in said outlet chamber, and wherein said housing provides a pressure chamber between said first piston surface and an interior housing wall, conduit means for allowing fluid to flow from said inlet chamber to said pressure chamber for urging said piston in a forward direction, and a spring means for urging said piston in a rearward direction, whereby under conditions in which the pressure drop between said inlet and outlet chambers is normal, the rearward forces generated by pressurized fluid in said outlet chamber and said spring force are sufficient to overcome the forward force generated by pressurized fluid in said pressure chamber and thereby maintain said valve in said first position;

wherein the forward end of said second piston includes an annular shoulder, and a piston wall projecting forward of said shoulder, with a plurality of V-shaped openings immediately forward of said shoulder, and with the smaller end of the V-shaped openings facing the shoulder, wherein said V-shaped openings provide fluid communication between said inlet chamber and said outlet chamber, whereby as said piston approaches the closed position, the surface area available in said V-shaped openings for fluid communication decreases due to their "V" shape.

4. An elevator according to claim 3, wherein said stem is coupled to said housing for adjustment in an axial direction for increasing or decreasing the distance between said open and closed positions.

* * * * *